United States Patent [19]
Bereskin et al.

[11] 4,113,617
[45] Sep. 12, 1978

[54] GREASE SEPARATOR

[76] Inventors: Fred Phillip Bereskin, 117 Red Oak La., Highland Park, Ill. 60035; Joseph Jerome Borowczyk, 116 W. Central Blvd., Villa Park, Ill. 60181

[21] Appl. No.: 789,426

[22] Filed: Apr. 21, 1977

[51] Int. Cl.² .............................................. B01D 17/04
[52] U.S. Cl. ................... 210/72; 210/73 W; 210/83; 210/85; 210/149; 210/153; 210/187; 210/299; 210/521; 210/532 R; 210/DIG. 5; 210/DIG. 8; 210/DIG. 25; 210/DIG. 26
[58] Field of Search ................ 210/71, 72, 73 W, 83, 210/84, 85, 138, 139, 140, 143, 149, 153, 187, 205, 207, 209, 252, 320, 322, 513, 521, 522, 532 R, 533, 537, 538, 540, DIG. 5, DIG. 8, DIG. 25, DIG. 26, 536, 299

[56] References Cited

U.S. PATENT DOCUMENTS

| 3,300,053 | 1/1967 | Peters | 210/540 |
| 3,847,814 | 11/1974 | Adachi | 210/532 R |
| 3,962,076 | 6/1976 | Hess et al. | 210/83 |
| 3,971,719 | 7/1976 | Peters | 210/540 |

Primary Examiner—Frank Sever
Attorney, Agent, or Firm—Robert E. Wagner; Gerald T. Shekleton

[57] ABSTRACT

A grease separating system includes four successive chambers. The heated, emulsified grease is passed through a solids retention box into an inlet chamber where cool water is sprayed onto the emulsified grease. This mixture is passed through a connecting chamber, and then over baffles at the entrance of a collection chamber. The grease having been separated from its emulsified state rises to the top of the mixture in the collection chamber, and the water passes into a discharge chamber and in to the connected sewer system. After successive operations, the floated grease is sensed when it reaches a predetermined level, and an alarm is sounded to indicate that the accumulated grease should be removed.

16 Claims, 3 Drawing Figures

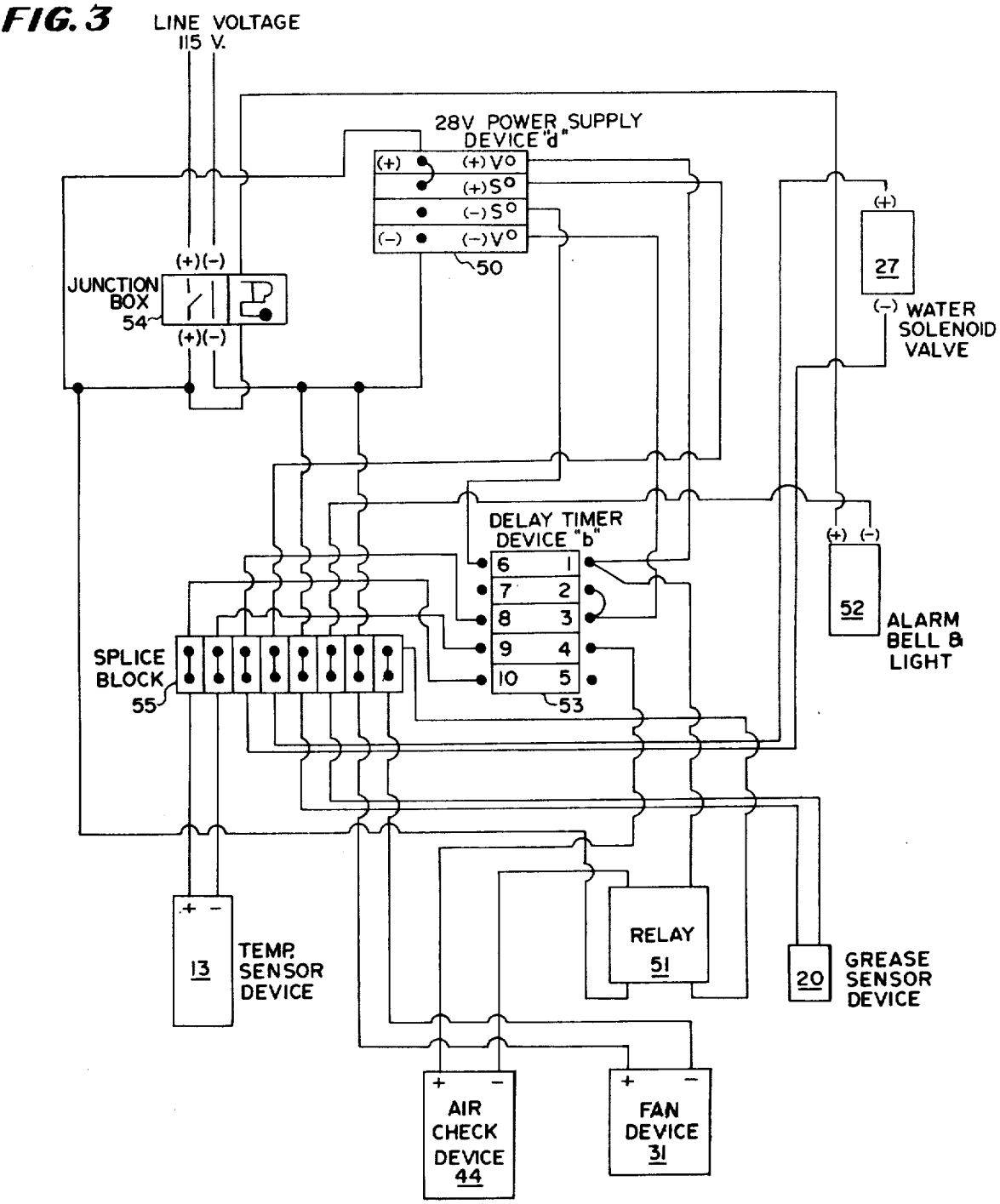

GREASE SEPARATOR

BACKGROUND OF THE INVENTION

Various attempts have been made to prevent contamination of sewer systems with grease and/or oil effluent. Sometimes pressure is utilized in a closed vessel to attempt the separation of the liquid and particulate matter, and frequently straightforward settling is utilized. Other approaches use skimming-type devices in an attempt to physically displace the lighter liquids from the top of a settling tank.

It is a primary object of the present invention to provide a grease separation system which employs successive steps in sequence for effective separation of emulsified grease from water.

An important object of the present invention is the provision of the appropriate steps, in the proper sequence, to effect such separation in the most efficient manner but with a minimum of expense.

A corollary object of the invention is to provide such a separation system with appropriate safeguards against contamination of the water supply system used with the invention, and removal of heated vapors from the system which aids the cooling processes.

SUMMARY OF THE INVENTION

Grease traps are employed in many industries to separate fats, oils and greases, hereinafter referred to as "F.O.G.", from water thereby preventing grease from entering sewer systems. These traps are in fact a requirement in certain industries and communities. All grease traps consist of a baffled chamber in which "F.O.G." are collected and the water entering this chamber with the "F.O.G." is allowed to discharge into available sewerage systems. Such traps can be an effective means of minimizing "F.O.G." contamination provided the "F.O.G." is not in an emulsified state. If the "F.O.G." is emulsified, physical separation of the aqueous and non-aqueous phase does not take place and a plain or standard trap is ineffective.

Several types of emulsions can occur. In one type, a semi-permanent emulsion is present and is not broken under ordinary means. In such emulsions an emulsifying agent is usually present and the emulsion must be broken by physical or chemical means before it can be separated in a trap or other separation equipment.

A second type of emulsion which is encountered in many industries is very temporary. These emulsions occur frequently but are not limited to the food industry. An example of their occurance is when fats, shortenings or hardened oils are washed into grease traps or other collecting vessels with hot water or steam during a cleaning process. This heated water has the effect of melting and mixing the "F.O.G." material forming a temporary emulsion. A typical or standard grease trap is very inefficient under these conditions. The heated emulsified "F.O.G." passes through the trap in a single phase. This temporary emulsion is treatable in the subject invention, in fact experiments have shown that effluents from this trap have passed effluent standards of a community while a standard grease trap not modified to our invention did not.

In the subject invention, the temporary emulsion is cooled so that phase separation occurs thus allowing the separated "F.O.G." to be collected. The cooling of the emulsion is accomplished by spraying cool water into the hot effluent. The invention also consists of sensing devices that turn on and off the cooling operation as required. A further aspect of said invention is a sensor that senses the presence of aqueous and non-aqueous phases subsequently sounding an alarm when the chamber containing the separated "F.O.G." reaches a predetermined capacity. This offers another means of preventing contamination of a sewerage system and thereby avoiding violation of local, E.P.A. and state ordinances.

THE DRAWINGS

In the several figures of the drawings, like reference numerals identify like components, and in those drawings:

FIG. 3 is a simplified wiring diagram depicting the interconnection of the controls with the inventive system.

DETAILED DESCRIPTION OF THE INVENTION

Figure 1:
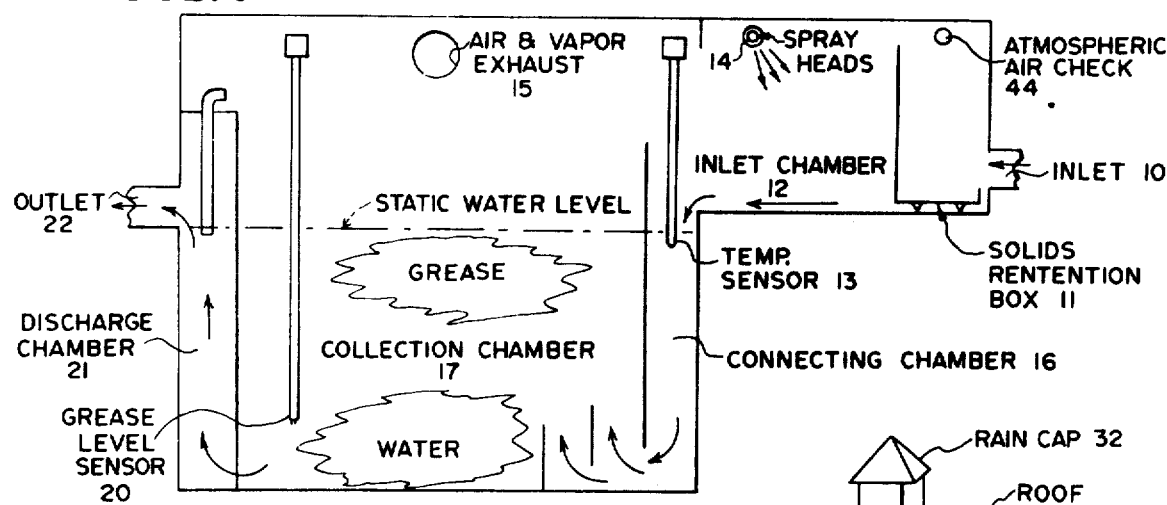
FIG. 1 is a simplified view of the several chambers of the grease separation system of this invention.

FIG. 1 is a simplified showing of the major chambers of the invention. At the right side is an inlet 10, for receiving emulsified heated influent, and the inlet discharges into a solids retention box 11. This retention box is perforated or made foraminous to trap solids and large particulate matter which may be mixed with the influent. Thus only emulsified liquids and minute particles pass through the pores of the solids retention box into the inlet chamber 12. As the influent moves into chamber 16, it contacts a temperature sensor 13, to be more fully described hereinafter. This signal is utilized to initiate a cycle in which cool water is sprayed from the sprinkler heads 14 and mixes with the emulsified influent material. Other cooling devices for use in connection with this part of the system, including the means for removing steam and vapor through the exhaust opening 15, will be described in connection with FIG. 2.

For the present it is sufficient to note that the influent with the added water flows by gravity into the upper portion of connecting chamber 16, and then downwardly to the bottom of connecting chamber 16, where it passes under the chamber wall into the collection chamber 17, the main collecting chamber of the system. The baffles 18 and 19 deflect the entering water and effluent upwardly as the liquid enters collection chamber 17. Because of the difference in density, and the fact the incoming oil and grease matter is still at a temperature higher than that of the sprayed-in water, the grease floats to the top in collection chamber 17. This allows the water to pass downwardly, into the discharge chamber 21, for passage outwardly to the outlet 22 to the sewer system. After several such operations, the grease will be collected generally as shown at the top of chamber 17. Another sensor 20 is provided in the collection chamber 17, to provide an electrical output signal when the level of the accumulated grease reaches the sensor. This is utilized to energize an alarm, as will be described in connection with FIG. 2, to signal the attendant that the accumulated matter should be removed from the system. With this general perspective of the flow through the several chambers of the inventive system, a more detailed description of the equipment will now be given, followed by the operating sequence.

Figure 2:
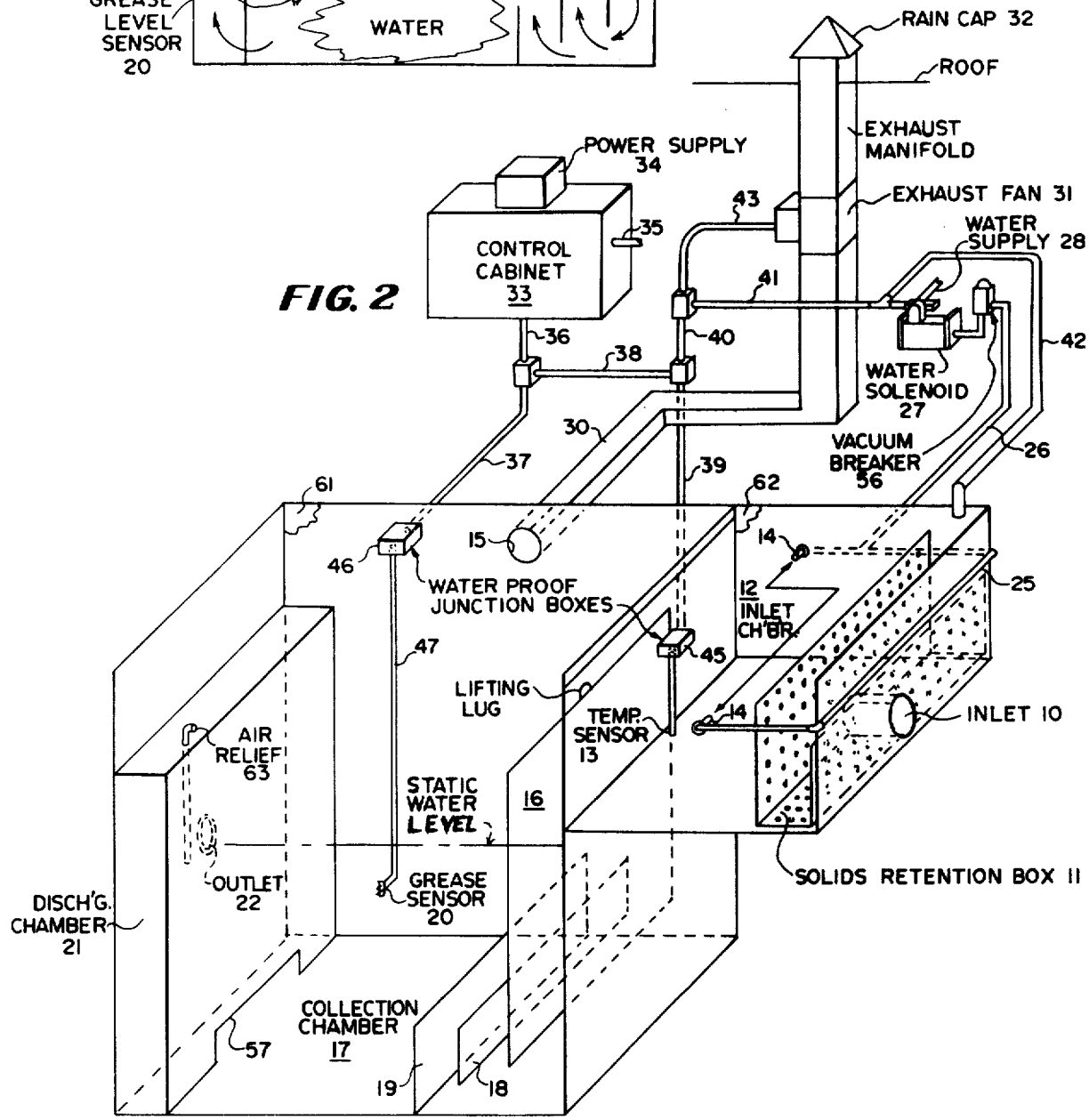
FIG. 2 is a perspective illustration, partly broken away and partly in block form, depicting the system of this invention and the associated controls.

FIG. 2 shows inlet 10 and solids retention box 11 in the right, as previously indicated. The individual spray heads 14 are supplied from a pipe 25, shown coupled to another pipe 26 which carries water through a solenoid valve 27, from an inlet supply line 28, whenever the water control solenoid valve is energized. The air exhaust outlet 15 is coupled to a duct 30, and an exhaust fan 31 is inserted in the vertical portion of the duct for removing steam or vapor from the chamber 17 when the fan is energized. The air is exhausted upwardly and deflected by the rain cap 32 into the atmosphere.

Electrical energy for the different functions is supplied from a control cabinet 33 which includes a power supply 34. The equipment in this cabinet and the power supply 34 are energized from the conventional 115 volt, 60 cycle power line received in cable 35. This control energy is then distributed through the individual conduits 36-43 to the individual components. The wiring for 115 volts extends through the conduits 36, 38, 40, and 43 to energize the fan motor; the remainder of the wiring is low voltage for control purposes. In the preferred embodiment 28 volts was found suitable for use in the control functions. This includes 28 volt wiring extending through the previously mentioned conduits, and conduit 41 to energize solenoid 27, and also through conduit 42 to energize an air check device 44. This is a unit which allows fresh air to enter the chamber 12 at atmospheric pressure, replacing the air drawn out through opening 15 into the exhaust duct.

The low voltage wiring in conduit 39 is connected, through a junction box 45, to temperature sensor 13. This sensor can be a conventional unit, of the type conventionally termed a thermoswitch. This switch is used to provide a signal when the hot influent raises the temperature of sensor 13, for use by a timer in control cabinet 33. Low voltage wiring also extends through conduit 37 to another junction box 46, with control wiring in conduit 47 extending down to the grease sensor 20.

Before describing the operation, those skilled in the art will understand the electrical wiring diagram shown in FIG. 3 is illustrative of one arrangement found suitable for practicing the invention. Other systems can be devised to regulate the system operation as the influent and sprayed water are moved through the system as described. From the diagram, it is evident that the incoming line voltage is supplied to the 28 volt power supply 38, to the contacts of relay 51 for energizing fan 31 when the relay is operated, and to an alarm bell and light unit 52 for energization when the grease sensor 20 provides a signal to this unit. The power supply 38 provides 28 volt energy to a delay timer 53. This is a conventional unit which provides output power to the water solenoid valve 27, and (when used in the system) to the air check unit 44 and the relay 51, whenever a signal is provided by the temperature sensor 13. The junction box 54 and splice block 55 are conventional devices which facilitate interconnection of the different components.

The operation is best described in connection with FIG. 2. As there shown, the emulsified heated influent enters through inlet 10 and the larger particles are trapped in the solids retention box 11. As the influent moves across inlet chamber 12 and into chamber 16, it contacts temperature sensor 13 which energizes the delay timer 53. The thermoswitch can be set to provide this signal over a temperature range adjustable from −100° F. to +400° F. The precise setting is determined by the particular application requirements, and is done at the time the system is installed. The delay timer 53 maintains its output signal for a preset time, say from 30 to 300 seconds, after this signal is received from sensor 13. The output signal from timer 53 energizes water solenoid valve 27, allowing the water from supply line 28 to pass through vacuum breaker 56 and line 26 to the spray heads 14. Vacuum breaker 56 is an anti-siphon unit. which insures there is absolutely no possibility of water from chamber 12 backing up through the supply line 28, to contaminate the potable water supply.

In those applications where an air check 44 and an exhaust fan 31 are utilized, these units are energized simultaneously with energization of solenoid valve 27. Thus air enters from outside the system through air check 44 into chamber 12, and the vapors are drawn off through duct 30 by operation of the fan 31. The duct pipe, exhaust fan size and specific air check vary with the size of the installed system; it is emphasized that these are optional equipment not installed in every system, and not requisite for the basic operation of the inventive system. When no air check and no exhaust are used, air venting is accomplished through a plumbing fixture or influent drain.

The cool water is sprayed on the influent and by gravity enters chamber 16, flowing downwardly through this connecting chamber and into collection chamber 17. The liquids are diverted upwardly by the baffles 18 and 19, with grease and oil matter then floating on the top in chamber 17, with the water collecting in the lower part. The water thus can pass through the opening 57 into discharge chamber 21 and through outlet 22 to the sewer system. Air relief 63 prevents siphoning of the trap by the sewer system and also avoids turbulance caused by siphoning.

After several of these sequential operations, the grease and oil content builds up in collection chamber 17 and eventually contacts sensor 20. This closes a circuit which energizes the alarm bell and light unit 52, sounding the alarm and illuminating a light to ensure that maintenance personnel are alerted. A switch can be installed in the control cabinet 33 to turn off the alarm bell, but maintain a light energized until the accumulated matter is removed from the chamber.

In the preferred embodiment, the walls of the chambers were made of black steel plate, 3/16 or ¼ inch thick. The precise dimensions vary with each application. A gas tight cover 61 is used to seal the top of collection chamber 17, and if necessary, a similar cover 62 can be supplied for the inlet chamber 12. All wiring is made consistent with local codes and watertight junction boxes are used.

It is noted that the system will still operate if the entering influent is below the temperature necessary to activate sensor 13. Cooling will occur as the influent mixes with water already trapped in the chambers, and by the natural action of the different viscosities, the grease and oils will rise to the top of the water in the collection chamber.

While only a particular embodiment of the invention has been described and illustrated, it is apparent that various alterations and modifications may be made therein. It is therefore the intention in the appended claims to cover such modifications and alterations as may fall within the true spirit and scope of this invention.

What is claimed is:

1. A system for separating hot, emulsified grease and oil from water to prevent contamination of a sewage system comprising:

an inlet chamber, including a plurality of steel plates forming the chamber walls and floor, a solids retention bed adjacent one wall of the chamber, an inlet channel extending through said one wall and into said box, a temperature sensor positioned below the chamber floor for providing a control signal dependent on temperature and, at least one water spray head positioned in the chamber walls, and means to provide said hot, emulsified grease and oil as a free flowing film on said chamber floor; said at least one spray head being sized to spray cool, ambient temperature water over substantially the entire of said free flowing film;

a collection chamber also having a plurality of steel plates forming the chamber walls and floor, a plurality of baffles positioned to deflect incoming liquids upwardly, and a grease level sensor at a desired height above the floor of the collection chamber;

a connecting chamber between the inlet chamber and the collection chamber for directing the flow of grease and water from the inlet chamber downwardly to enter the collection chamber adjacent said baffles;

a discharge chamber including a common wall with the collection chamber, which common wall has an opening at the bottom to admit liquids and an outlet in another wall of the discharge chamber to pass liquids to a sewer;

a valve coupled to a source of water supply and responsive to the control signal; and, a means between the solenoid valve and spray heads for preventing back-up of liquids through the valve to the water supply.

2. A system as claimed in claim 1, and further comprising an adjustable delay timer, coupled between the temperature sensor and the solenoid valve, for regulating the duration of water spray into the inlet chamber.

3. A system as claimed in claim 2, and further comprising an air check unit in one wall of the inlet chamber, an exhaust duct coupled between the collecting chamber and the atmosphere, an exhaust fan positioned in the exhaust duct, and means for energizing the air check unit and the exhaust fan from the delay timer concomitantly with energization of the solenoid valve.

4. A system as claimed in claim 1, and further comprising an alarm unit, coupled to the grease level sensor, for providing an alarm when the accumulated grease reaches the predetermined capacity.

5. A system as claimed in claim 1, and further comprising a gas tight cover on the collection chamber.

6. A system as claimed in claim 5, and further comprising a second gas tight cover, on the inlet chamber.

7. The method of separating heated emulsified grease from water to prevent the contamination of a sewer system by cooling and sequentially regulating passage of the grease and water mixture through a grease-separator system having an inlet chamber, a collection chamber and a discharge chamber, said inlet chamber having a sensing means for sensing temperature, a spray means for spraying cool, ambient temperature water into the inlet chamber and an actuating means for actuating said spray means, comprising the steps of:

admitting the heated emulsified grease and water mixture into said inlet as a free flowing film on the horizontal planar floor of said inlet chamber;

sensing the temperature of the heated mixture in the inlet chamber by said sensing means;

signaling said actuating means with said sensing means;

actuating said spray means with said actuating means so as to spray substantially the entire of said free flowing film with said water;

allowing said cooled mixture to pass from the inlet chamber into the bottom of said collection chamber;

said grease separating from the cooled mixture and rising to the top of the mixture;

the water separating from the cooled mixture and sinking to the bottom of the collection chamber;

allowing the separated water to pass from the bottom of the collection chamber to the bottom of said discharge chamber and to be removed from said system, and, removing the cooled and separated grease from the collection chamber.

8. The method described in claim 1, and comprising the additional step of allowing the mixture of cool water and heated grease to pass from the inlet chamber through a connecting chamber before reaching the collection chamber.

9. The method described in claim 1, in which the spraying of cool water into the inlet chamber is continued for a pre-set time after the presence of the heated grease is sensed.

10. A system for separating hot, emulsified grease from water prior to entry into a sewage system to prevent contamination of the sewage system, including:

an inlet chamber having a lower inlet surface across which the incoming hot, emulsified grease mixture can flow; said inlet chamber comprising a horizontal planar floor and means to provide said incoming hot, emulsified grease as a free flowing film on said horizontal planar floor;

spray means, including a valve for cooling the grease mixture by admitting cool, ambient temperature water into the inlet chamber for contact with the hot grease mixture; said spray means being sized to spray said cool, ambient temperature water over substantially the entire of said free flowing film;

a collection chamber having a lower surface below the lower inlet surface of the inlet chamber;

a connecting chamber defining a path between the inlet chamber and the collection chamber such that the cooled mixture can flow by gravity into the collection chamber;

a discharge chamber including a lower portion having an opening communicating with the collection chamber; and, a temperature sensor means in the connecting chamber for transmitting a signal to said valve for actuating said valve upon sensing the temperature of said hot grease mixture, said valve thereby admitting cool, ambient temperature water on to the hot grease mixture and cooling said grease mixture, whereby said grease is separated from the water.

11. A system as claimed in claim 10, and further comprising timer means, coupled between the temperature sensor and the valve, for regulating the time duration of the water spraying.

12. A system as claimed in claim 5, in which said timer means includes means for varying said time duration.

13. A system as claimed in claim 11, and further comprising an air check unit mounted in a wall of the inlet chamber to regulate the admission of air, an exhaust duct coupled between the collecting chamber and the atmosphere, an exhaust fan positioned in said duct, and circuit means, coupled between the timer means and both the air check unit and the exhaust fan, for energizing the air check unit and the exhaust fan when the valve is energized.

14. A system as claimed in claim 10, and further comprising a plurality of baffles, positioned in the entrance to the collection chamber, to deflect the entering liquid upwardly.

15. A system as claimed in claim 10, and further comprising an alarm unit, and sensing means, coupled to said alarm unit and positioned in the collection chamber at a preset height above the collection chamber floor, for energizing the alarm unit when the accumulated grease rises to the preset height.

16. A system as claimed in claim 10, and in which a plurality of spray heads are positioned to spray water into the inlet chamber, and a vacuum breaker, coupled between the valve and the spray heads, to prevent contamination of the potable water supply.

* * * * *